United States Patent [19]

Naraghi et al.

[11] Patent Number: 5,611,992
[45] Date of Patent: *Mar. 18, 1997

[54] CORROSION INHIBITOR BLENDS WITH PHOSPHATE ESTERS

[75] Inventors: Ali Naraghi, Missouri City; Nick Grahmann, Sugar Land, both of Tex.

[73] Assignee: Champion Technologies Inc., Houston, Tex.

[*] Notice: The term of this patent shall not extend beyond the expiration date of Pat. No. 5,611,991.

[21] Appl. No.: 599,430

[22] Filed: Jan. 17, 1996

Related U.S. Application Data

[63] Continuation of Ser. No. 322,943, Oct. 12, 1994, abandoned, which is a continuation-in-part of Ser. No. 248,370, May 24, 1994, abandoned.

[51] Int. Cl.$^6$ ........................................... C23F 11/16
[52] U.S. Cl. .................................. 422/15; 422/7; 422/16; 507/238
[58] Field of Search ................................ 422/7, 15, 16, 422/17; 507/238, 939

[56] References Cited

U.S. PATENT DOCUMENTS

| | | | |
|---|---|---|---|
| 3,510,436 | 5/1970 | Silverstein et al. | 422/15 X |
| 3,617,578 | 11/1971 | Stanford et al. | 210/700 |
| 3,650,981 | 3/1972 | Inouye et al. | 252/389.21 |
| 3,655,569 | 4/1972 | Hellsten et al. | 252/99 |
| 4,339,349 | 7/1982 | Martin et al. | 507/238 |
| 4,388,214 | 6/1983 | Oppenlaender et al. | 252/392 |
| 4,389,371 | 6/1983 | Wilson et al. | 422/15 |
| 4,511,480 | 4/1985 | Outlaw et al. | 507/238 |
| 4,604,226 | 8/1986 | Bartlett | 252/305 |

FOREIGN PATENT DOCUMENTS

| | | |
|---|---|---|
| 1269273 | 5/1968 | Germany . |
| 3206205 | 9/1983 | Germany . |
| 3537696 | 4/1987 | Germany . |
| 8745023 | 2/1987 | Japan . |
| 8901407 | 1/1991 | Netherlands . |

Primary Examiner—Christopher Kim
Attorney, Agent, or Firm—Gunn & Associates, P.C.

[57] ABSTRACT

The present invention relates to blends of individual corrosion inhibitors with phosphate esters for protection of ferrous metals against attack by a corrosive environment. These blends are synergistically more effective than each of the individual corrosion inhibitors. The phosphate esters of the present invention are the reaction products of ethoxylated, propoxylated, or butoxylated alcohols or phenols with phosphating agents. Other corrosion inhibitors suitable for blending with the phosphate esters include fatty amines, poly amides, imidazolines, poly imidazolines, quaternary amines, poly quats and dimer, trimer, and polymeric acids. Phosphate esters may comprise any portion of the total amount of corrosion inhibitors in the blend, but the preferred concentration is from about 5 to about 50 weight percent phosphate ester. The corrosion inhibitor blends may be diluted to any concentration with solvents or other fluids as necessary for particular applications.

20 Claims, No Drawings

5,611,992

CORROSION INHIBITOR BLENDS WITH PHOSPHATE ESTERS

This application is a continuation of application Ser. No. 08/322,943, filed Oct. 12, 1994, abandoned, which is a continuation-in-part application of U.S. patent application Ser. No. 08/248,370 filed May 24, 1994, abandoned.

FIELD OF THE INVENTION

This invention relates to the inhibitors of corrosion caused by hydrogen sulfide, carbon dioxide, low molecular weight organic acids, inorganic salts, and combinations of these materials. More particularly, this invention relates to blends of corrosion inhibitors, wherein one of the corrosion inhibitors is a phosphate ester.

BACKGROUND OF THE DISCLOSURE

Pure metals and their alloys tend to combine with the elements of a corrosive medium to form stable compounds. These compounds are referred to as the corrosion product and the metal surface is said to be corroded.

While corrosion can take several forms, it is usually confined to the metal surface. Additionally, corrosion can also occur along grain boundaries because of differences in chemical resistance or local electrolytic action.

In most aqueous systems, the corrosion reaction has anodic and cathodic components which occur simultaneously at discrete points on the surface of the metal. Electrons flow from an anodic site on the metal surface to a cathodic site on the metal surface to equalize the potential.

In many applications, it may not be economical to use the most corrosion resistant material or a material with satisfactory corrosion resistance may not be known. Other methods of avoiding corrosion, such as the use of glass, ceramic, and organic coatings, may also be prohibitively expensive or incompatible with other process conditions. Similarly, the use of sacrificial anodes to achieve cathodic protection may not achieve satisfactory results or be otherwise practical in many applications.

An alternative approach is to minimize the corrosion by adding inhibitors to the corrosive medium. The use of corrosion inhibitors is generally most attractive in closed or recirculating systems in which the annual cost of inhibitor is low. However, inhibitors have also proven to be economical in many once-through systems, such as those encountered in petroleum-processing operations. Inhibitors are effective due to their controlling influence over the reactions which occur at the cathode or anode sites on the metal surface.

Examples of inhibitors used for minimizing corrosion of iron and steel in contact with aqueous solutions are the soluble chromates and silicates. Some organic sulfide and amine materials are also effective in minimizing corrosion of iron and steel in acid solutions. Such inhibitors may be effective for use with stainless steel and other alloy steel materials as well.

One disadvantage of many known inhibitors is that these inhibitors are only soluble in the aqueous phase. However, metals are subject to corrosion in oil and gas pipelines, transmission lines, and wells, as well as aqueous systems such as water-disposal systems and processing equipment such as separators, water treatment units, and dehydration units. This type of equipment is subject to damaging corrosion which can require expensive replacement or cause catastrophic failure. An extensive amount of time and money has been spent attempting to minimize or eliminate corrosion in a wide variety of materials and environments.

Therefore, there is a need for a corrosion inhibitor system that is considerably more effective at protecting ferrous and nonferrous metals against attack by a corrosive environment than corrosion inhibitors available in the past. There is also a need for methods of preventing metal corrosion in petroleum and chemical processing equipment, including pipelines, wells, and water treatment units.

SUMMARY OF THE INVENTION

The present invention provides blends of corrosion inhibitors. The inhibitor blends achieve synergistically better results than the individual corrosion inhibitors. The corrosion inhibitor blends of the present invention comprise (a) a compound selected from the group consisting of fatty amines, poly amides, imidazolines, poly imidazolines, quaternary amines, poly quats, dimer acids, trimer acids, polymeric acids, and mixtures thereof; and (b) a phosphate ester defined by the formula $[R-X-(C_mH_{2m}O)_n]_k-PO(OH)_{(3-k)}$, where R is an alkyl group containing 4 to 18 carbon atoms or an alkylaryl group comprising an aryl group selected from the group consisting of phenol, diphenol, and mixtures thereof, and an alkyl group containing 4 to 18 carbon atoms; X is selected from the group consisting of a carboxyl group (—COO—), oxygen (—O—), secondary amine group (—NH—), sulfur and mixtures thereof; m is an integer having a value from about 2 to about 4; n is an integer having a value from about 1 and about 20; and k is from 1 to 2.

The present invention also provides a method for inhibiting metal corrosion including introducing an inhibitor, as described above, into a corrosive environment.

DETAILED DESCRIPTION

The present invention relates to certain blends of corrosion inhibitors, where at least one of the corrosion inhibitors is a phosphate ester. These blends are considerably more effective than individual corrosion inhibitors currently available. In accordance with the invention, these corrosion inhibitor blends are highly effective for protection of ferrous metals against attack by a corrosive environment. The inventor believes that the inhibitors become chemically absorbed onto the surface of metals, thereby preventing corrosion.

The phosphate esters of the present invention are the reaction products of ethoxylated, propoxylated, or butoxylated alcohols or phenols with phosphating agents. While phosphate esters are preferably produced by a series of two reactions, their production in any manner is within the scope of the present invention.

The phosphate esters of the present invention may be characterized further by formula (I):

$$[R-X-(C_mH_{2m}O)_n]_k-PO(OH)_{(3-k)} \qquad (I)$$

where R is either an alkyl group, an aryl group, or an alkylaryl group. The alkyl group may be linear or branched and contain from 4 to 18 carbon atoms. Where R is an alkylaryl group or an arylalkyl group, the group includes an aryl radical such as phenol, diphenol, other hydroxy containing aryl radicals, alkylated hydroxyaryl group, or mixtures thereof and one or more C4 to C18 alkyl groups.

The component X is selected from the group consisting of a carboxyl group (—COO—), and oxygen atom (—O—), a secondary amine group (—NH—), and mixtures thereof.

The components R and X, taken together, or R—X— are obtained using the reactant R—X—H. Examples of R—X—H include alcohols, carboxylic acids, and amines.

The variable m in ($C_mH_{2m}O$) is an integer having a value from about 2 to about 4. The starting material or reactant used to obtain an m of 2, 3, or 4 is ethylene oxide, propylene oxide, or butylene oxide, or mixtures thereof, respectively. Of course, higher alkylene oxides may also be used, but they are less efficient than the compositions of the present invention made with these three alkylene oxides.

The variable n in ($C_mH_{2m}O)_n$ is an integer having a value from about 1 to about 20. The value of n is determined by the number of molar equivalents of ethylene oxide, propylene oxide, or butylene oxide allowed to react or polymerize with the reactant R—X—H.

The products of formula (I) can be prepared preferentially in a two step process as shown below.

In Reaction (1), R—X—H is reacted with an alkylene oxide ($C_mH_{2m}O)_n$ to yield an intermediate R—X capped alkylene oxide oligomer containing from about 1 to about 20 alkylene oxide units. The intermediate product R—X—($C_mH_{2m}O)_n$—H is obtained through Reaction (1):

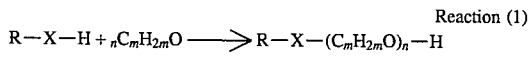

Reaction (1)

(a)

In Reaction (2), 3 moles of intermediate (a) are reacted with 1 mole of $P_2O_5$ in a preferred Reaction(2).

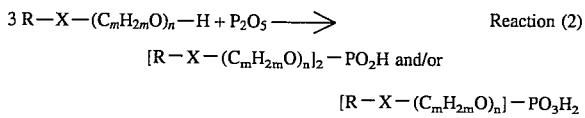

Reaction (2)

It is preferred that the reaction conditions be adjusted to favor formation of mono- and di- alkyl phosphates. This is accomplished by maintaining the reaction temperature below 110° C.

Phosphating groups that may be used in the reaction of Equation (2) include phosphorus pentoxide ($P_2O_5$) and phosphorus oxychloride ($POCl_3$). The preferred phosphating group is phosphorus pentoxide.

Since corrosion primarily occurs in the aqueous phase, many previously known inhibitors are formulated for application directly into produced water either as a dispersion or fully dissolved. The class of phosphate ester compounds described above have a tendency to partition in the aqueous phase but will also be found in the organic phases. Therefore, these compounds are capable of being used alone, in a solvent(s), or in combination with other corrosion inhibitors.

The corrosion inhibitor blends of the present invention include the phosphate esters, described above, mixed with other types of corrosion inhibitors, such as imidazolines, bis-imidazolines, tri-imidazolines, amides, poly amides, quaternary amine compounds, or related groups.

When using the phosphate esters, it is important that they be introduced into a corrosive environment in an effective amount to inhibit corrosion of the metal surface of the vessel or pipe. An effective amount of phosphate esters for reducing the corrosion rate has been shown to be a concentration of from about 2 ppm to about 100 ppm. It is preferred that the phosphate esters be maintained at a concentration of about 5 ppm to about 15 ppm.

According to the present invention, the phosphate esters, described above, are blended with other corrosion inhibitors to achieve synergistic results. The phosphate esters may be present in any concentration, but the preferred concentration is from about 5 to about 50 weight percent phosphate ester in relation to the total weight of all the corrosion inhibitors. The most preferred concentration of phosphate esters is about 10 weight percent. It should be noted that the corrosion inhibitors may be diluted with solvents or other fluids as necessary for particular applications.

One class of corrosion inhibitors which may be blended with the phosphate esters is primary amine terminated amides prepared by reacting an amine and a fatty acid. The primary amines include alkyl amines, alkyl diamines, and alkyl polyamines with an alkyl group or groups containing from 12 to 36 carbons. The amines suitable for use in the present invention include butylamine, 2-ethylhexylamine, decylamine, monoethanolamine, and cyclohexylamine and a number of its alkyl substituted derivatives. A wide variety of polyamines can be used as well.

The fatty acid should contain at least 12, and preferably at least 18 carbon atoms, per molecule, but generally should not exceed about 60 carbon atoms. The fatty acid may contain aliphatic, aromatic, or cyclic groups and may be linear, branched, saturated, or unsaturated. The preferred fatty acids are linear fatty acids which are either saturated or unsaturated.

Examples of fatty acids suitable for reacting with the amines include tall oil, oleic acid, crude tall oil, stearic acid, palmitic acid, animal oils, dimer acid, trimer acid, and vegetable oils or acids derived from such oils, and mixtures of these acids.

Amides are formed by the reaction of about one equivalent of primary amine (—$NH_2$) per equivalent of acid (—COOH) in the fatty acid. The term "equivalents" is used in its ordinary sense and, accordingly, each free primary amine and each free carboxyl group on the reactants is one equivalent. The primary amine terminated amides are formed by carrying out the reaction at a temperature from about 330° F. to about 380° F. and preferably about 350° F. At these temperatures, the desired amide or poly amides will be formed rather than amine-acid salts.

When the amines have the formula:

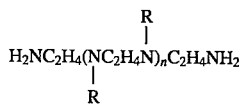

the final reaction products of such amines with fatty acids at about 480° F. are imidazolines.

A second class of corrosion inhibitors which may be blended with the phosphate esters is quaternary ammonium compounds such as quaternary compounds imidazolines, alkylpyridinium salts, and quaternary ammonium salts.

The alkylpyridinium residual salts suitable for use in the present invention are represented by the following formulas:

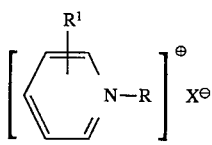

-continued

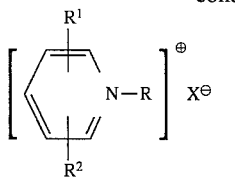

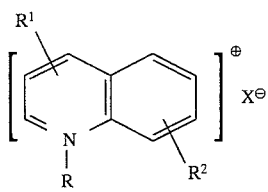

In the above formulas for alkylpyridinium salts, R is methyl, ethyl, or benzyl; R1 and R2 are alkyl or alkylaryl groups with 1 to 12 carbon atoms, where the aryl group contains 6 carbon atoms; and X is halide, preferably chloride.

The quaternary ammonium salts suitable for use in the present invention are represented by the following formulas:

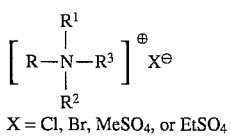

$X = Cl, Br, MeSO_4, or EtSO_4$

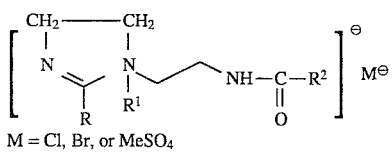

$M = Cl, Br, or MeSO_4$

In the above formulas for quaternary ammonium salts, R contains 8 to 18 carbon atoms and may be substituted or unsubstituted, linear or branched; R1 and R2 are methyl or ethyl; and R3 is methyl, ethyl or benzyl. Quaternary ammonium salts suitable for use in accordance with the present invention include alkyl pyridinium quaternary salts and dimethyl alkyl amine where the alkyl group is C12 to C18.

In order to fully understand the nature of the present invention and methods by which the compounds are formed and used, the following examples are provided. It should be recognized that the number of compounds which may be prepared according to the present invention are not limited to the particular compounds exemplified.

EXAMPLE 1

A phosphate ester was prepared by first reacting one molar equivalent of 2-ethylhexanol with 8 equivalents of ethylene oxide. Three equivalents of the resulting liquid ethoxylated ether were further reacted by slowly adding one equivalent of phosphorus pentoxide ($P_2O_5$) with very efficient stirring. The reaction vessel was placed in a cool water bath to prevent the exothermic reaction from increasing the reaction temperature above 110° C. and causing discoloration. By the time all the phosphorus pentoxide had been added to the vessel, the reaction was 80–90% complete. The vessel was stirred for an additional four hours at a temperature up to 110° C. until all the phosphorus pentoxide had been dissolved. The product was a solution of phosphate esters made up of mostly mono- and diesters. The color of the solution was mostly clear, but took on an amber color with heating.

EXAMPLE 2

A phosphate ester was prepared according to the procedure in Example 1 using heptanol instead of 2-ethylhexanol.

EXAMPLE 3

A phosphate ester was prepared according to the procedure in Example 1 using octanol instead of 2-ethylhexanol and 8 equivalents of ethylene oxide.

EXAMPLE 4

A phosphate ester was prepared according to the procedure in Example 1 using decanoic acid instead of 2-ethylhexanol and 4 equivalents of ethylene oxide.

EXAMPLE 5

A phosphate ester was prepared according to the procedure in Example 1 using dodecanol instead of 2-ethylhexanol and 4 equivalents of ethylene oxide.

EXAMPLE 6

A phosphate ester was prepared according to the procedure in Example 1 using tetradecanol instead of 2-ethylhexanol and 8 equivalents of ethylene oxide.

EXAMPLE 7

A phosphate ester was prepared according to the procedure in Example 1 using hexadecanoic acid instead of 2-ethylhexanol and 8 equivalents of ethylene oxide.

EXAMPLE 8

A phosphate ester was prepared according to the procedure in Example 1 using octadecanol instead of 2-ethylhexanol and 8 equivalents of ethylene oxide.

EXAMPLE 9

A phosphate ester was prepared according to the procedure in Example 1 using phenol instead of 2-ethylhexanol and 4 equivalents of ethylene oxide.

EXAMPLE 10

A phosphate ester was prepared according to the procedure in Example 1 using nonylphenol instead of 2-ethylhexanol and 9 equivalents of ethylene oxide. It should be recognized that any alkyl phenol can be used in place of nonylphenol.

EXAMPLE 11

A phosphate ester was prepared according to the procedure in Example 1 using a C9 alkyl diphenol instead of 2-ethylhexanol and 8 equivalents of ethylene oxide. It should be recognized that any alkyl diphenol can be used in place of the C9 alkyl diphenol.

EXAMPLE 12

A phosphate ester was prepared according to the procedure in Example 1 using a mixture of heptanol, octanol, decanoic acid, dodecanol, tetradeconal, hexadecanoic acid, octadecanol, phenol, alkylphenol, and alkyldiphenol instead of 2-ethylhexanol and 4 equivalents of ethylene oxide.

EXAMPLE 13

To determine the effectiveness of the phosphate esters of the present invention, a set of corrosion tests were conducted. AISI-1018 mild steel coupons with dimensions of 3"×0.5"×0.005" were cleaned in xylene, rinsed in isopropyl alcohol, dried, and weighed. The steel coupons were then placed in 50 individual 200 ml glass long-necked bottles.

A "sweet test" was performed by purging 25 bottles with only carbon dioxide. A "sour test" involved purging 25 bottles with carbon dioxide and hydrogen sulfide. During the purge, each bottle in both tests received 60 ml of a solution containing 10% NaCl brine and 60 ml of deodorized kerosene. Each of the inhibitors of Examples 1 through 12 were added to two bottles in each test—one having 5 ppm inhibitor and the other having 15 ppm inhibitor. One bottle in each test received no inhibitor and served as a blank. The bottles were then filled with carbon dioxide and immediately capped to prevent the intrusion of air.

The bottles were rotated in a wheel cabinet at 180° F. for 24 hours before removing, cleaning rinsing, drying, and weighing the coupons again. The percent protection may be determined by weight loss according to the following formula:

$$\text{Percent Protection} = (W1 - W2)/W1 \times 100$$

where;
W1=Weight loss of blank coupon in milligrams
W2=Weight loss of inhibited coupon in milligrams The corrosion rate experienced by the coupons in mils per year (thousandths of an inch) was calculated according to the following formula:

$$\text{Corrosion Rate (mpy)} = \frac{(W \times 534)}{D \times A \times T}$$

where;
W=Weight loss of coupon in milligrams (mg)
D=Density of the steel coupons in grams per cubic centimeter (g/cm$^3$)
A=Area of coupon in square inches (in$^2$)
T=Time of exposure in hours (hr)

The results from the corrosion tests of Example 13 are given in Tables 1, below.

TABLE 1

| Example | Phosphate Esters Inhibitor Concentration (ppm) | Corrosive Agent | Corrosion Rate (MPY) |
|---|---|---|---|
| Blank | 0 | $CO_2$ | 44.3 |
|  | 0 | $H_2S$ | 44.75 |
| 1 | 5 | $CO_2$ | 2.26 |
|  |  | $H_2S$ | 4.0 |
|  | 15 | $CO_2$ | 1.6 |
|  |  | $H_2S$ | 3.36 |
| 2 | 5 | $CO_2$ | 3.94 |
|  |  | $H_2S$ | 2.88 |
|  | 15 | $CO_2$ | 3.2 |
|  |  | $H_2S$ | 2.54 |
| 3 | 5 | $CO_2$ | 3.1 |
|  |  | $H_2S$ | 3.45 |
|  | 15 | $CO_2$ | 2.2 |
|  |  | $H_2S$ | 2.25 |
| 4 | 5 | $CO_2$ | 3.08 |
|  |  | $H_2S$ | 3.17 |

TABLE 1-continued

| Example | Phosphate Esters Inhibitor Concentration (ppm) | Corrosive Agent | Corrosion Rate (MPY) |
|---|---|---|---|
|  | 15 | $CO_2$ | 1.94 |
|  |  | $H_2S$ | 1.58 |
| 5 | 5 | $CO_2$ | 1.29 |
|  |  | $H_2S$ | 1.77 |
|  | 15 | $CO_2$ | 0.86 |
|  |  | $H_2S$ | 2.02 |
| 6 | 5 | $CO_2$ | 1.48 |
|  |  | $H_2S$ | 2.78 |
|  | 15 | $CO_2$ | 0.63 |
|  |  | $H_2S$ | 2.2 |
| 7 | 5 | $CO_2$ | 2.1 |
|  |  | $H_2S$ | 3.26 |
|  | 15 | $CO_2$ | 1.8 |
|  |  | $H_2S$ | 1.92 |
| 8 | 5 | $CO_2$ | 4.2 |
|  |  | $H_2S$ | 3.02 |
|  | 15 | $CO_2$ | 1.24 |
|  |  | $H_2S$ | 2.75 |
| 9 | 5 | $CO_2$ | 14.5 |
|  |  | $H_2S$ | 2.49 |
|  | 15 | $CO_2$ | 14.8 |
|  |  | $H_2S$ | 2.73 |
| 10 | 5 | $CO_2$ | 2.56 |
|  |  | $H_2S$ | 2.16 |
|  | 15 | $CO_2$ | 1.7 |
|  |  | $H_2S$ | 1.73 |
| 11 | 5 | $CO_2$ | 2.47 |
|  |  | $H_2S$ | 2.69 |
|  | 15 | $CO_2$ | 2.7 |
|  |  | $H_2S$ | 2.16 |
| 12 | 5 | $CO_2$ | 3.72 |
|  |  | $H_2S$ | 2.88 |
|  | 15 | $CO_2$ | 2.97 |
|  |  | $H_2S$ | 2.29 |

EXAMPLE 14

290 grams (1.0 mole) of tall oil were added 103 grams (1.0 mole) of diethylenetriamine (DETA). Once the addition was complete, the temperature was increased to 350° F. After four hours of the reaction about 18 grams of water had been removed from the mixture. This amount represented substantially the theoretical amount of water which would have been removed in a 1:1 molar reaction between the tall oil and DETA. The resulting product was 100% amide. The amide was heated, with continuous stirring, to 480° F. for 5 hours. At the end of the reaction, an additional 18 grams of water were collected in a receiver trap. The resulting product contained 90% imidazoline and 10% amide. This final reaction product can be blended with any of the phosphate esters of the present invention.

The product was tested as a corrosion inhibitor both by itself and blended to the phosphate ester of Example 1. In both sweet ($CO_2$) and sour ($H_2S$) conditions, 20 parts per million (ppm) of the corrosion inhibitor were used. Results of the corrosion tests for the imidazoline/amide product alone and blended with ten percent (10%) phosphate ester of Example 1 are recorded in Tables 2 and 3, respectively.

EXAMPLE 15

Following the procedure outlined in Example 14, 378 grams (2.0 moles) of tetraethylenepentamine (TEPA) were reacted with 460 grams (1.0 mole) of dimer trimer acid (which are essentially monomeric, dimeric and trimeric, branched or linear chain, unsaturated aliphatic acids and rosin acids having 15 to 60 carbons) to produce mono, di and tri imidazoline. Results of the corrosion tests for the imidazoline/amide product alone and blended with ten percent (10%) phosphate ester of Example 2 are recorded in Tables 2 and 3, respectively.

EXAMPLE 16

Following the procedure outlined in Example 14, 103 grams (1.0 mole) of DETA was reacted with 580 grams (2.0 moles) of tall oil. Results of the corrosion tests for the imidazoline/amide product alone and blended with ten percent (10%) phosphate ester of Example 3 are recorded in Tables 2 and 3, respectively.

EXAMPLE 17

Following the procedure outlined in Example 14, 146 grams (1.0 mole) of triethylenetetramine (TETA), which is a mixture of linear, branched, and cyclic molecules including linear TETA, Tris(aminoethyl)amine, piperazinoethylethylenediamine and Bis(aminoethyl)piperazine, was reacted with 580 grams (2.0 moles) of tall oil. Results of the corrosion tests for the imidazoline/amide product alone and blended with ten percent (10%) phosphate ester of Example 4 are recorded in Tables 2 and 3, respectively.

EXAMPLE 18

Following the procedure outlined in Example 14, 146 grams (1.0 mole) of triethylenetetramine (TETA) was reacted with 290 grams (1.0 moles) of tall oil. Results of the corrosion tests for the imidazoline/amide product alone and blended with ten percent (10%) phosphate ester of Example 5 are recorded in Tables 2 and 3, respectively.

EXAMPLE 19

Following the procedure outlined in Example 14, 189 grams (1.0 mole) of tetraethylenepentamine (TEPA) was reacted with 580 grams (2.0 moles) of tall oil. Results of the corrosion tests for the Bis-imidazoline product alone and blended with ten percent (10%) phosphate ester of Example 6 are recorded in Tables 2 and 3, respectively.

EXAMPLE 20

Following the procedure outlined in Example 14, 205 grams (1.0 mole) of cocoamines were reacted with 290 grams (1.0 mole) of tall oil. Results of the corrosion tests for the fatty amide product alone and blended with ten percent (10%) phosphate ester of Example 7 are recorded in Tables 2 and 3, respectively.

EXAMPLE 21

Results of the corrosion tests for an ethoxylated polyamide alone and blended with the phosphate ester of Example 8 are recorded in Tables 2 and 3, respectively.

EXAMPLE 22

Following the procedure outlined in Example 14, one mole of dimethylalkyl amine (DMAA)(where R contains 12 to 18 carbon atoms) was reacted with one mole of benzyl chloride. Results of the corrosion tests for the quaternary ammonium product alone and blended with ten percent (10%) phosphate ester of Example 9 are recorded in Tables 2 and 3, respectively.

EXAMPLE 23

Following the procedure outlined in Example 14, 104 grams (1.0 mole) of aminoethylethanolamine (AEEA) was reacted with 320 grams of crude tall oil. Results of the corrosion tests for the product alone and blended with ten percent (10%) phosphate ester of Example 10 are recorded in Tables 2 and 3, respectively.

TABLE 2

Individual Inhibitors

| Example | Inhibitor Composition | Mole Ratio of Reaction | Corrosive Agent | Corrosion Rate (MPY) |
|---|---|---|---|---|
| Blank | — | — | $CO_2$ | 34.08 |
|  | — | — | $H_2S$ | 51.20 |
| 14 | DETA:Tall Oil | 1:1 | $CO_2$ | 2.53 |
|  |  | 1:1 | $H_2S$ | 3.85 |
| 15 | TEPA:Dimer-Trimer Acid | 2:1 | $CO_2$ | 2.70 |
|  |  | 2:1 | $H_2S$ | 2.46 |
| 16 | DETA:Tall Oil | 1:2 | $CO_2$ | 2.03 |
|  |  | 1:2 | $H_2S$ | 2.92 |
| 17 | TETA:Tall Oil | 1:2 | $CO_2$ | 4.23 |
|  |  | 1:2 | $H_2S$ | 4.40 |
| 18 | TETA:Tall Oil | 1:1 | $CO_2$ | 4.00 |
|  |  | 1:1 | $H_2S$ | 3.74 |
| 19 | TEPA:Tall Oil | 1:2 | $CO_2$ | 3.09 |
|  |  | 1:2 | $H_2S$ | 4.12 |
| 20 | Cocoamine:Tall Oil | 1:1 | $CO_2$ | 6.4 |
|  |  | 1:1 | $H_2S$ | 4.7 |
| 21 | Ethoxylated Fatty Amide | 1:1 | $CO_2$ | 4.10 |
|  |  | 1:1 | $H_2S$ | 7.40 |
| 22 | DMAA:Benzyl Chloride | 1:1 | $CO_2$ | 3.80 |
|  |  | 1:1 | $H_2S$ | 3.70 |
| 23 | AEEA:Crude Tall Oil | 1:1 | $CO_2$ | 2.60 |
|  |  | 1:1 | $H_2S$ | 2.30 |

TABLE 3

Inhibitors Blended With Phosphate Esters

| Example | Inhibitor Composition | Mole Ratio of Reaction | Corrosive Agent | Corrosion Rate (MPY) |
|---|---|---|---|---|
| Blank | — | — | $CO_2$ | 31.4 |
|  | — | — | $H_2S$ | 43.2 |
| 14 | DETA:Tall Oil + Phosphate Ester of Ex. 1 | 1:1 | $CO_2$ $H_2S$ | 1.25 2.1 |
| 15 | TEPA:Dimer-Trimer Acid + Phosphate Ester of Ex. 2 | 2:1 | $CO_2$ $H_2S$ | 1.2 2.1 |
| 16 | DETA:Tall Oil + Phosphate Ester of Ex. 3 | 1:2 | $CO_2$ $H_2S$ | 1.8 2.2 |
| 17 | TETA:Tall Oil + Phosphate Ester of Ex. 4 | 1:2 | $CO_2$ $H_2S$ | 3.0 3.4 |
| 18 | TETA:Tall Oil + Phosphate Ester of Ex. 5 | 1:1 | $CO_2$ $H_2S$ | 2.7 3.1 |
| 19 | TEPA:Tall Oil + Phosphate Ester of Ex. 6 | 1:2 | $CO_2$ $H_2S$ | 1.75 3.44 |
| 20 | Cocoamine:Tall Oil + Phosphate Ester of Ex. 7 | 1:1 | $CO_2$ $H_2S$ | 3.47 4.14 |
| 21 | Ethoxylated Fatty Amide + Phosphate Ester of Ex. 8 | — | $CO_2$ $H_2S$ | 1.59 4.23 |
| 22 | DMAA:Benzyl Chloride + Phosphate Ester of Ex. 9 | 1:1 | $CO_2$ $H_2S$ | 2.6 2.9 |
| 23 | AEEA:Crude Tall Oil + Phosphate Ester of Ex. 10 | 1:1 | $CO_2$ $H_2S$ | 2.0 2.1 |

While the foregoing is directed to the preferred embodiment of the present invention, other and further embodiments of the invention may be devised without departing from the basic scope thereof which is determined by the claims that follow.

What is claimed is:

1. A method of inhibiting corrosion of metal process equipment in an oilfield corrosive environment comprising the step of introducing a corrosion inhibiting effective amount of a corrosion inhibitor in the absence of oxygen comprising:

(b) at least one phosphate ester defined by the equation:

$$[R-X-(C_mH_{2m}O)_n]_k-PO(OH)_{(3-k)}$$

where;
R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;
X is selected from the group consisting of a carboxyl group (—COO—), oxygen (—O—), and a secondary amine group (—NH—);
m is from 2 to 4;
n is between about 1 and about 20; and
k is from 1 to 2.

2. The method of claim 1 further comprising the step of maintaining an effective concentration of the inhibitor for substantially preventing corrosion of metals.

3. The method of claim 2 wherein the metal is a ferrous metal.

4. The method of claim 1 wherein about 2 ppm to about 100 ppm phosphate esters are introduced into the corrosive environment.

5. The method of claim 4 wherein about 5 ppm to about 15 ppm phosphate esters are introduced into the corrosive environment.

6. A method of inhibiting corrosion of metal surfaces in an oil field corrosive environment comprising the step of contacting a metal surface with a stream containing a corrosion inhibiting effective amount of a corrosion inhibitor in the absence of oxygen comprising:

(a) a compound selected from the group consisting of fatty amines, poly amides, imidazolines, poly imidazolines, quaternary amines, poly quats, dimer acids, trimer acids, polymeric acids, and mixtures thereof; and (b) at least one phosphate ester defined by the formula:

$$[R-X-(C_mH_{2m}O)_n]_k-PO(OH)_{(3-k)}$$

where;
R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;
X is selected from the group consisting of a carboxyl group (—COO—), oxygen (—O—), and a secondary amine group (—NH—);
m is from 2 to 4;
n is between about 1 and about 20; and
k is from 1 to 2.

7. The method of claim 6 further comprising the step of maintaining an effective concentration of the inhibitor for substantially preventing corrosion of metals.

8. The method of claim 7 wherein the metal is a ferrous metal.

9. The method of claim 8 wherein about 2 ppm to about 100 ppm phosphate esters are introduced into the corrosive environment.

10. The method of claim 9 wherein about 5 ppm to about 15 ppm phosphate esters are introduced into the corrosive environment.

11. A method of inhibiting corrosion of metal process equipment in an oilfield corrosive environment comprising the step of introducing a corrosion inhibiting effective amount of a corrosion inhibitor in the absence of oxygen comprising:

(a) a compound selected from the group consisting of fatty amines, poly amides, imidazolines, poly imidazolines, quaternary amines, poly quats, dimer acids, trimer acids, polymeric acids, and mixtures thereof; and (b) at least one phosphate ester defined by the equation:

$$[R-X-(C_mH_{2m}O)_n]_k-PO(OH)_{(3-k)}$$

where;
R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;
X is selected from the group consisting of a carboxyl group (—COO—), oxygen (—O—), and a secondary amine group (—NH—);
m is from 3 to 4;
n is between about 1 and about 20; and
k is from 1 to 2.

12. The method of claim 11 wherein k is 2.

13. A method of inhibiting corrosion of metal surfaces in an oil field corrosive environment comprising the step of contacting a metal surface with a stream containing a corrosion inhibiting effective amount of a corrosion inhibitor in the absence of oxygen comprising:

(a) a compound selected from the group consisting of fatty amines, poly amides, imidazolines, poly imidazolines, quaternary amines, poly quats, dimer acids, trimer acids, polymeric acids, and mixtures thereof; and (b) at least one phosphate ester defined by the formula:

$$[R-X-C_mH_{2m}O)_n]_k-PO(OH)_{(3-k)}$$

where;
R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;
X is selected from the group consisting of a carboxyl group (—COO—), and a secondary amine group (—NH—);
m is from 2 to 4;
n is between about 1 and about 20; and
k is from 1 to 2.

14. A method of inhibiting corrosion of metal surfaces in an oil field corrosive environment comprising the step of contacting a metal surface with a stream containing a corrosion inhibiting effective amount of a corrosion inhibitor in the absence of oxygen consisting essentially of:

(a) a compound selected from the group consisting of fatty amines, poly amides, imidazolines, poly imidazolines, quaternary amines, poly quats, dimer acids, trimer acids, polymeric acids, and mixtures thereof; and (b) at least one phosphate ester defined by the formula:

$$[R-X-C_mH_{2m}O)_n]_k-PO(OH)_{(3-k)}$$

where;

R is an alkyl group containing 4 to 18 carbon atoms or an alkylaryl group comprising an aryl group selected from the group consisting of phenol, diphenol, and mixtures thereof, and an alkyl group containing 4 to 18 carbon atoms;

X is selected from the group consisting of a carboxyl group (—COO—), oxygen (—O—), and a secondary amine group (—NH—);

m is from 2 to 4;

n is between about 1 and about 20; and k is from 1 to 2.

15. The method of claim 6 where n is about 8.
16. The method of claim 13 where n is about 8.
17. The method of claim 14 where n is about 8.
18. The method of claim 6 where n is up to about 12.
19. The method of claim 13 where n is up to about 12.
20. The method of claim 14 where n is up to about 12.

* * * * *